(12) United States Patent
Aoyama et al.

(10) Patent No.: US 11,858,473 B2
(45) Date of Patent: Jan. 2, 2024

(54) VEHICLE WASHING DEVICE, VEHICLE WASHING METHOD AND RECORDING MEDIUM

(71) Applicant: DENSO CORPORATION, Kariya (JP)

(72) Inventors: Takahiro Aoyama, Kariya (JP); Kento Hashimoto, Kariya (JP); Daisuke Shirakura, Kariya (JP)

(73) Assignee: DENSO CORPORATION, Kariya (JP)

( * ) Notice: Subject to any disclaimer, the term of this patent is extended or adjusted under 35 U.S.C. 154(b) by 364 days.

(21) Appl. No.: 17/279,481

(22) PCT Filed: Aug. 7, 2019

(86) PCT No.: PCT/JP2019/031204
§ 371 (c)(1),
(2) Date: Mar. 24, 2021

(87) PCT Pub. No.: WO2020/066322
PCT Pub. Date: Apr. 2, 2020

(65) Prior Publication Data
US 2021/0402958 A1    Dec. 30, 2021

(30) Foreign Application Priority Data
Sep. 25, 2018   (JP) .................................. 2018-179053

(51) Int. Cl.
*B60S 1/08*        (2006.01)
*B60S 1/48*        (2006.01)
(Continued)

(52) U.S. Cl.
CPC ............. *B60S 1/0848* (2013.01); *B60S 1/485* (2013.01); *B60S 1/546* (2013.01); *B60S 1/583* (2013.01)

(58) Field of Classification Search
CPC ............... B60S 1/08; B60S 1/583; B60S 1/52
See application file for complete search history.

(56) References Cited

U.S. PATENT DOCUMENTS

2008/0060677 A1* 3/2008 Nakano ................... B60S 1/486
                                                                    134/6
2015/0178902 A1* 6/2015 Lee ......................... B60S 1/0818
                                                                    382/104
(Continued)

FOREIGN PATENT DOCUMENTS

JP    2004-148899 A    5/2004
JP    2005-319983 A    11/2005
(Continued)

OTHER PUBLICATIONS

Sep. 10, 2019 Search Report issued in International Patent Application No. PCT/JP2019/031204.

*Primary Examiner* — Michael D Jennings
(74) *Attorney, Agent, or Firm* — Oliff PLC

(57) ABSTRACT

An imaging device images rearward of a vehicle through a windshield from inside a cabin of the vehicle, and a vehicle washing device includes a wiping device and a controller. The wiping device is capable of reciprocatingly wiping a predetermined range of the windshield. The predetermined range of the windshield includes an imaging range for the imaging device. The controller switches operation of the wiping device to one of a first mode or a second mode in accordance with an input. In the first mode, the wiping device wipes the predetermined range of the windshield. In the second mode, the wiping device wipes the imaging range of the windshield preferentially compared to the first mode.

13 Claims, 12 Drawing Sheets

(51) Int. Cl.
*B60S 1/54* (2006.01)
*B60S 1/58* (2006.01)

(56) References Cited

U.S. PATENT DOCUMENTS

| | | | | |
|---|---|---|---|---|
| 2016/0375821 | A1* | 12/2016 | Schofield | F21S 41/60 |
| | | | | 701/36 |
| 2016/0375863 | A1* | 12/2016 | Carlsson | B60S 1/0822 |
| | | | | 701/49 |
| 2019/0084526 | A1* | 3/2019 | Seubert | G06T 5/007 |
| 2019/0210571 | A1* | 7/2019 | Ghannam | B60S 1/0818 |
| 2019/0248340 | A1* | 8/2019 | Chen | B60R 11/04 |
| 2023/0211754 | A1* | 7/2023 | Ostrogorski | B60S 1/3486 |
| | | | | 15/250.34 |

FOREIGN PATENT DOCUMENTS

| | | |
|---|---|---|
| JP | 2006-143150 A | 6/2006 |
| JP | 2008-068655 A | 3/2008 |
| JP | 2018-052276 A | 4/2018 |

\* cited by examiner

FIG.5
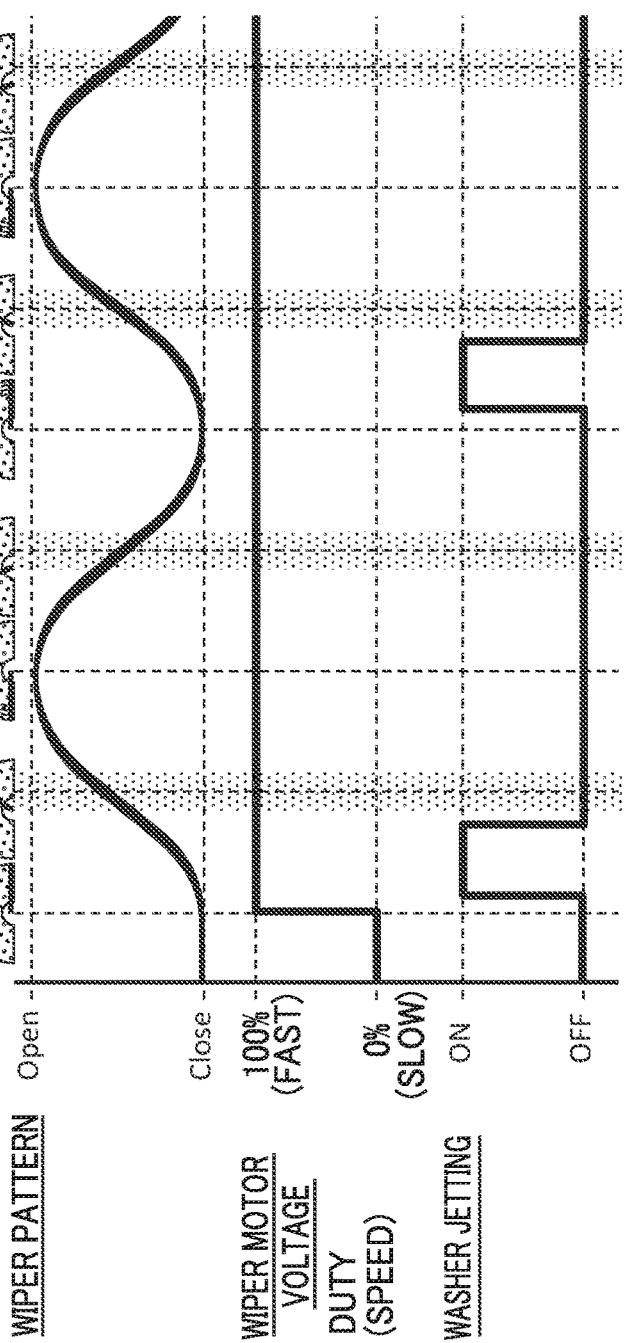
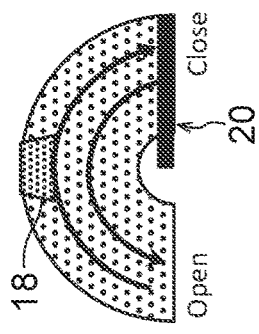

VEHICLE WASHING DEVICE, VEHICLE WASHING METHOD AND RECORDING MEDIUM

TECHNICAL FIELD

The present disclosure relates to a washing device for a vehicle.

BACKGROUND ART

Japanese Patent Application Laid-Open (JP-A) No. 2018-052276 recites a structure in which a wiper for a vehicle wipes between two pre-specified reverse positions of a rear windshield of the vehicle, encompassing an imaging region for an on-board sensor that images rearward of the vehicle.

SUMMARY OF INVENTION

Technical Problem

A degree of cleanliness of the imaging range for the on-board sensor (a degree to which dust, smears and the like are absent) has a large effect on images captured by the on-board sensor. However, with the structure in which the wiper for a vehicle wipes between the two pre-specified reverse positions of the rear windshield of the vehicle as in the technology recited in JP-A No. 2018-052276, if the degree of cleanliness falls due to, for example, deposits adhering in the imaging range for the on-board sensor, it is difficult to restore the degree of cleanliness promptly by removing the deposits or the like.

An object of the present disclosure is to provide a vehicle washing device that may quickly restore a degree of cleanliness of an imaging range for an imaging device in a windshield of a vehicle.

Solution to Problem

A vehicle washing device according to a first aspect of the present disclosure includes: a wiping device capable of reciprocatingly wiping a predetermined range of a windshield, the predetermined range including an imaging range for an imaging device that images rearward of a vehicle through the windshield from inside a cabin of the vehicle; and a controller that switches operation of the wiping device to one of a first mode or a second mode in accordance with an input, the first mode wiping the predetermined range of the windshield, and the second mode wiping the imaging range of the windshield preferentially compared to the first mode.

In the first aspect of the present disclosure, when the controller switches operation of the wiping device to the second mode in accordance with an input, the imaging range of the windshield is preferentially wiped. Thus, even if a degree of cleanliness (a degree to which dust, smears and the like are absent) of the imaging range for the imaging device in the windshield of the vehicle falls, the degree of cleanliness is quickly restored. When the controller switches operation of the wiping device to the first mode in accordance with an input, incidences of operation of the wiping device causing disturbance to an occupant of the vehicle are suppressed. Thus, according to the first aspect of the present disclosure, a degree of cleanliness of the imaging range for the imaging device in the windshield of the vehicle may be restored quickly.

In a second aspect of the present disclosure, in the vehicle washing device according to the first aspect: the input is a mode switching signal of an electronic mirror that is switchable between a mirror mode and an image display mode, the mirror mode reflecting light that is incident on a presenter, and the display mode displaying an image imaged by the imaging device at the presenter; and the controller sets operation of the wiping device to the first mode when the electronic mirror is in the mirror mode, and sets operation of the wiping device to the second mode when the electronic mirror is in the image display mode.

In the second aspect of the present disclosure, when the electronic mirror is in the mirror mode, operation of the wiping device is set to the first mode. Thus, incidences of operations of the wiping device that appear in the presenter of the electronic mirror causing disturbance to an occupant of the vehicle are suppressed. When the electronic mirror is in the image display mode, operation of the wiping device is set to the second mode. Thus, even if a degree of cleanliness of the imaging range for the imaging device in the windshield of the vehicle falls, the degree of cleanliness may be restored quickly, and disruption of images displayed at the presenter of the electronic mirror may be suppressed. Further, because the operation mode of the wiping device is switched in conjunction with switching of the mode of the electronic mirror, an occupant of the vehicle may be saved the inconvenience of instructing switching of the operation mode of the wiping device.

In a third aspect of the present disclosure, in the vehicle washing device according to the first aspect: the input is a switching signal of a selector switch that commands switching between the first mode and the second mode; and the controller sets operation of the wiping device to the first mode when the selector switch is in a state corresponding to the first mode, and sets operation of the wiping device to the second mode when the selector switch is in a state corresponding to the second mode.

In the third aspect of the present disclosure, the operation mode of the wiping device is switched in conjunction with changes in the state of the selector switch for instructing switching between the first mode and the second mode. Thus, by operating the selector switch, an occupant of the vehicle may switch the operation mode of the wiping device at desired timings.

In a fourth aspect of the present disclosure, in the vehicle washing device according to any of the first to third aspects, a deposit detector detects deposits on the imaging range of the windshield, and when a deposit is detected by the deposit detector, the controller sets operation of the wiping device to the second mode and causes the wiping device to perform a wiping operation.

Thus, when deposits adhere to the imaging range of the windshield, the deposits may be quickly removed and thus the degree of cleanliness of the imaging range may be quickly restored.

In a fifth aspect of the present disclosure, in the vehicle washing device according to any of the first to fourth aspects, when operation of the wiping device is set to the second mode, the controller causes the wiping device to wipe between a first predetermined position and a park position of the wiping device, the first predetermined position being specified to be between the imaging range of the windshield and a reverse position of the wiping device.

Thus, while operation of the wiping device is set to the second mode, the wiping range of the wiping device includes the imaging range of the windshield but the wiping range of the wiping device is narrower than while operation of the wiping device is switched to the first mode. Therefore, the imaging range of the windshield may be preferentially wiped in the second mode compared to the first mode.

In a sixth aspect of the present disclosure, in the vehicle washing device according to any of the first to fourth aspects, when operation of the wiping device is set to the second mode, the controller causes the wiping device to reciprocatingly wipe a predetermined number of times between a first predetermined position and a second predetermined position, the first predetermined position being specified to be between the imaging range of the windshield and a reverse position of the wiping device, and the second predetermined position being specified to be between the imaging range of the windshield and a park position.

Thus, when operation of the wiping device is set to the second mode, a number of wipes of the imaging range of the windshield is greater (a wiping frequency is higher) than when operation of the wiping mode is set to the first mode. Therefore, the imaging range of the windshield may be preferentially wiped in the second mode compared to the first mode.

In a seventh aspect of the present disclosure, in the vehicle washing device according to any of the first to fourth aspects, the predetermined range includes a first range and a second range excluding the first range, the first range including the imaging range of the windshield, and when operation of the wiping device is set to the second mode, the controller causes a wiping speed when the first range is being wiped by the wiping device to differ from a wiping speed when the second range is being wiped by the wiping device.

Thus, when operation of the wiping device is set to the second mode, the wiping speed by the wiping device in the first range of the windshield, which includes the imaging range, is different from the wiping speed in the second range, which is outside the first range. Therefore, the imaging range of the windshield may be preferentially wiped in the second mode compared to the first mode.

In an eighth aspect of the present disclosure, in the vehicle washing device according to the seventh aspect, the controller sets the wiping speed when the first range is being wiped by the wiping device to be lower than the wiping speed when the second range is being wiped by the wiping device.

Thus, the imaging range of the windshield may be preferentially wiped in the second mode compared to the first mode.

In a ninth aspect of the present disclosure, the vehicle washing device according to any of the first to eighth aspects further includes a washing fluid supplier including a washing fluid supply nozzle that supplies washing fluid onto the windshield. When the wiping device is operating from a park position of the wiping device toward a reverse position of the wiping device, the controller causes the washing fluid supplier to stop supply of the washing fluid when a wiping position by the wiping device reaches a third predetermined position, the third predetermined position being separated from the imaging range of the windshield by a predetermined distance to the side of the imaging range at which the park position is located.

Thus, due to supplies of washing fluid to the windshield by the supplier, disruption occurring in images captured by the imaging device via the windshield may be suppressed.

In a tenth aspect of the present disclosure, in the vehicle washing device according to the ninth aspect, when the wiping device is operating from the park position toward the reverse position of the wiping device, the controller causes the washing fluid supplier to supply the washing fluid when the wiping position by the wiping device reaches a fourth predetermined position, the fourth predetermined position being located at the side of the third predetermined position at which the park position is located.

Thus, while disruption occurring in images captured by the imaging device may be suppressed, washing fluid supplied onto the windshield by the supplier may be provided for washing of the imaging range effectively.

In an eleventh aspect of the present disclosure, the vehicle washing device according to any of the first to eighth aspects further includes: a droplet detector that detects droplets on the windshield; and an air supplier including an air supply nozzle that supplies air onto the windshield. When a droplet is detected by the droplet detector and operation of the wiping device is set to the second mode, the controller causes the wiping device to stop at a fifth predetermined position and causes the air supplier to supply air onto the imaging range, the fifth predetermined position being specified to be one of between the imaging range of the windshield and a reverse position of the wiping device or between the imaging range of the windshield and a park position of the wiping device.

Thus, droplets adhering in the imaging range of the windshield may be blown away.

In a twelfth aspect of the present disclosure, in the vehicle washing device according to the ninth aspect or the tenth aspect, the washing fluid supply nozzle is provided at a wiper of the wiping device.

Thus, washing fluid may be supplied to positions of the windshield that are closer to wiping positions by the wiper of the wiping device. Therefore, washing performance by the vehicle washing device may be improved.

In a thirteenth aspect of the present disclosure, in the vehicle washing device according to the eleventh aspect, the air supply nozzle is provided at a wiper of the wiping device.

Thus, air may be supplied to positions of the windshield that are closer to wiping positions by the wiper of the wiping device. Therefore, washing performance by the vehicle washing device may be improved.

BRIEF DESCRIPTION OF DRAWINGS

FIG. 5 is a timing chart showing an example of operation in a usual mode.

DETAILED DESCRIPTION

Below, examples of embodiments are described in detail with reference to the attached drawings.

First Exemplary Embodiment

Figure 1:
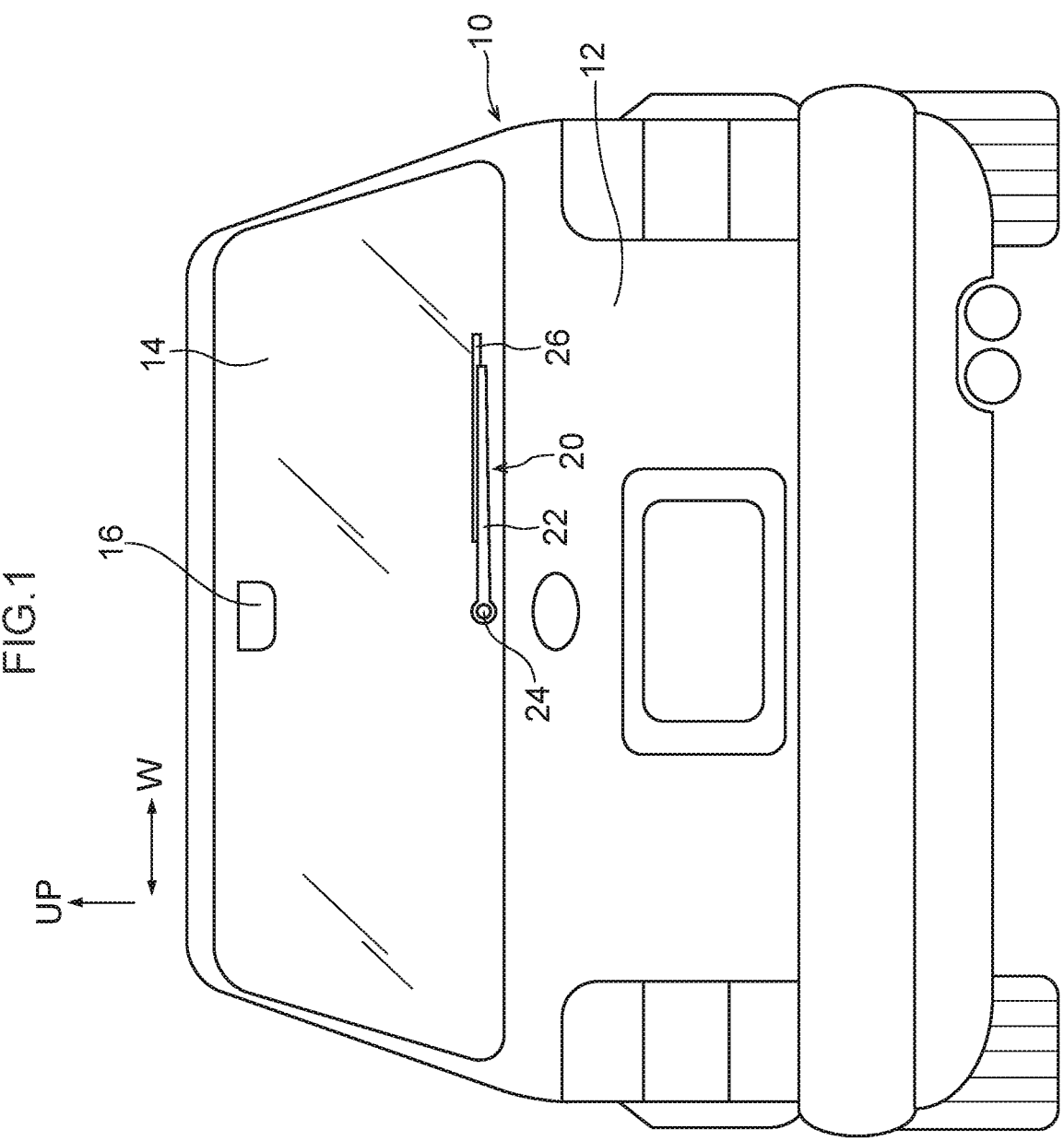
FIG. 1 is a plan view showing an example of a rear portion of a vehicle.
Figure 2:
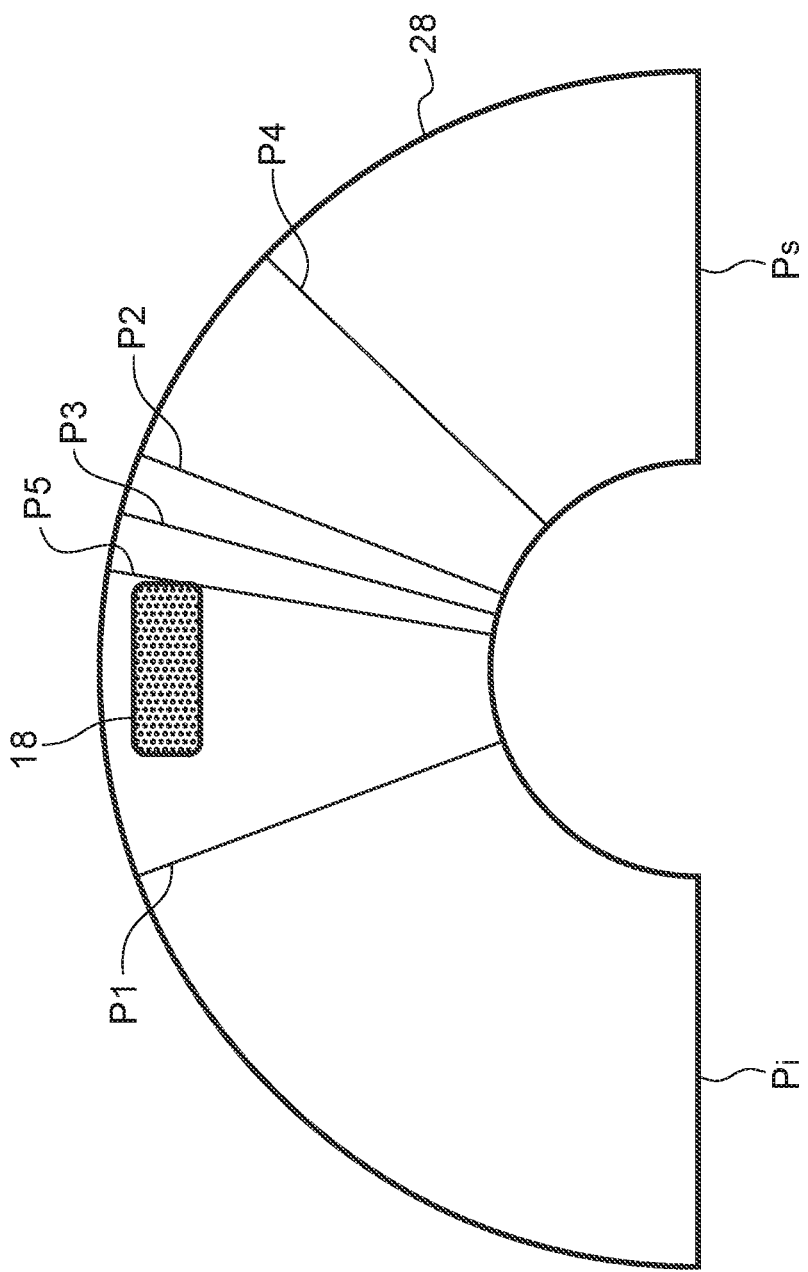
FIG. 2 is a plan view showing an example of a wiping range of a rear wiper and an imaging range of a rear camera.

As shown in FIG. 1, a rear windshield glass 14 that serves as an example of a windshield is mounted at a back door 12 of a vehicle 10. A rear camera 16 is provided at a vehicle width direction central portion vicinity of the back door 12, at a vehicle cabin inner side of a vehicle vertical direction upper end portion vicinity of the rear windshield glass 14. The rear camera 16 images rearward of the vehicle 10 through the rear windshield glass 14. In FIG. 2, a reference symbol 18 is assigned to an imaging range of the rear camera 16 in the rear windshield glass 14. The imaging range 18 corresponds to a display range displayed at a presenter 62, which is described below. The rear camera 16 is an example of a deposit detector.

Figure 3:
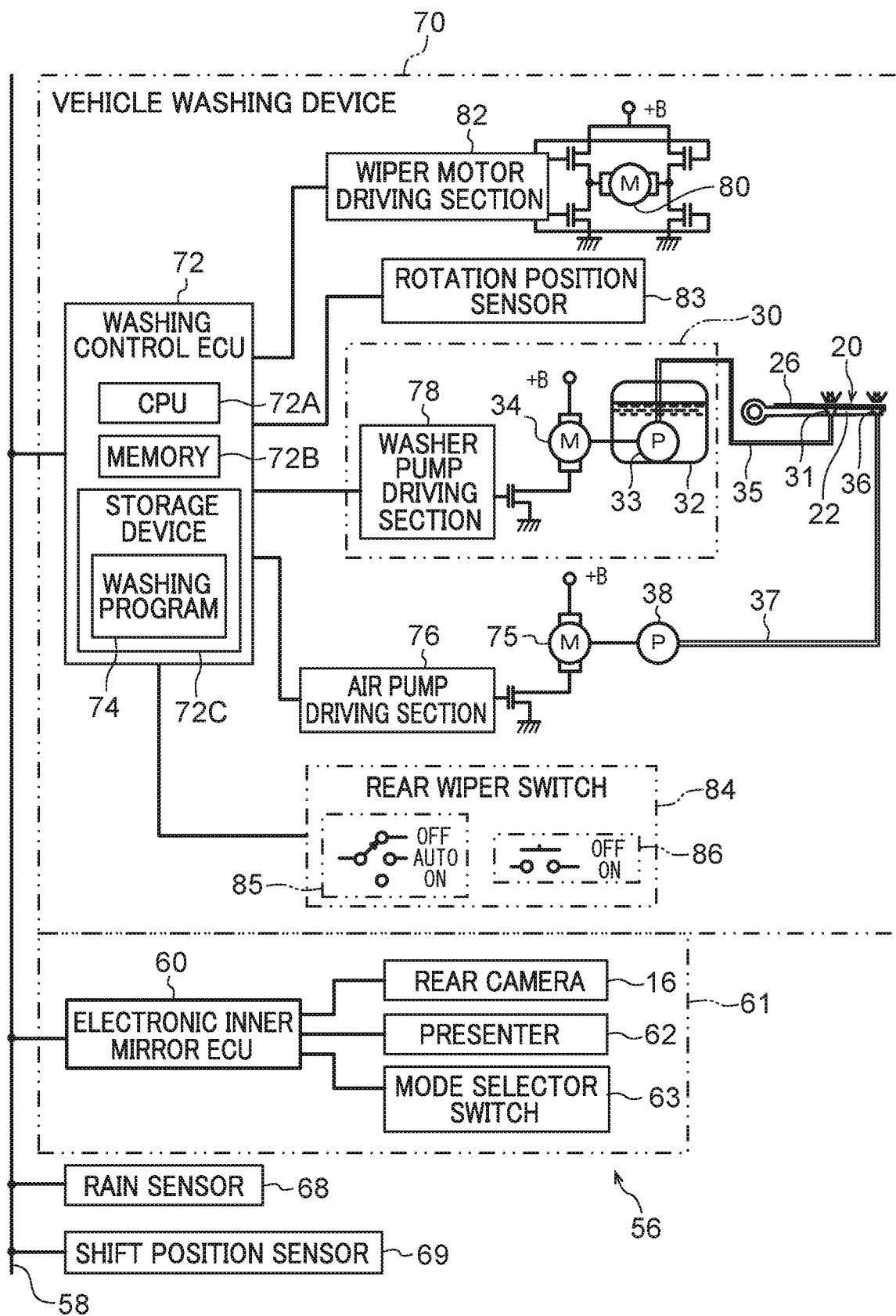
FIG. 3 is a block diagram showing an example of a schematic configuration of a control system.

As illustrated in FIG. 3, the rear camera 16, together with an electronic inner mirror ECU 60, the presenter 62 and a mode selector switch 63, constitutes an electronic inner mirror 61. The electronic inner mirror ECU (electronic control unit) is a control unit including a CPU, memory and a nonvolatile storage device. The presenter 62 is disposed at, for example, a vehicle width direction central portion vicinity above an instrument panel of the vehicle 10. A surface of the presenter 62 is formed as a half-mirror. The rear camera 16, the presenter 62 and the mode selector switch 63 are connected to the electronic inner mirror ECU 60.

As operation modes, the electronic inner mirror 61 is provided with a mirror mode and a camera mode (an image display mode). In the mirror mode, light that is incident on the presenter 62 is reflected from the surface of the presenter 62. In the camera mode, images rearward of the vehicle 10 that are captured by the rear camera 16 are displayed at the presenter 62. The operation mode of the rear camera 16 may be switched by an occupant of the vehicle 10 operating the mode selector switch 63. When the operation mode of the electronic inner mirror 61 is switched by operation of the mode selector switch 63, the electronic inner mirror ECU 60 sends mode switching signals to a washing control ECU 72, which is described below. The rear camera 16 is an example of an imaging device and the presenter 62 is an example of a presenter.

As shown in FIG. 1, a rear wiper 20 is provided at a vehicle vertical direction lower end portion vicinity of the rear windshield glass 14. The rear wiper 20 includes a wiper arm 22 and a wiper blade 26. A proximal end portion of the wiper arm 22 is fixed to a pivot axle 24, which is disposed at a vehicle width direction central portion vicinity of the vehicle vertical direction lower end portion vicinity of the rear windshield glass 14. The wiper blade 26 is coupled to a distal end portion of the wiper arm 22. The rear wiper 20 is operated by driving force from a wiper motor 80, which is shown in FIG. 3: the driving force from the wiper motor 80 is geared down and transmitted by a reducing gear mechanism, and turns the wiper arm 22 about the pivot axle 24.

As a result, the rear wiper 20 reciprocatingly moves the wiper blade 26 on the rear windshield glass 14. Thus, as illustrated in FIG. 2, the rear wiper 20 wipes a full wiping range 28 of the rear windshield glass 14 (when in a usual mode, which is described below) from a park position (a stowed position) Ps of the wiper blade 26 to a reverse position Pi of the wiper blade 26. The rear wiper 20 and wiper motor 80 are an example of a wiping device.

As illustrated in FIG. 3, a washer nozzle 31 of a rear washer 30 that serves as an example of a washing fluid supplier is attached partway along the wiper arm 22 of the rear wiper 20. The washer nozzle 31 is an example of a washing fluid supply nozzle. Together with a washer tank 32, a washer pump 33, a motor 34 and a hose 35, the washer nozzle 31 constitutes the rear washer 30. The washer tank 32, which stores washing fluid, is provided in an engine compartment of the vehicle 10. The washer pump 33 is attached to the washer tank 32 and sucks the washing fluid in the washer tank 32 from a floor portion of the washer tank 32. The hose 35 connects between the washer pump 33 and the washer nozzle 31. When the washer pump 33 (the motor 34) is driven, washing fluid is supplied from the washer pump 33 to the washer nozzle 31 via the hose 35, and the washing fluid is jetted out from the washer nozzle 31 onto the rear windshield glass 14. The washer pump 33 and the motor 34 are shown as separate in FIG. 3 but may be integrated.

As illustrated in FIG. 3, an air nozzle 36 is attached to a distal end portion of the wiper arm 22 of the rear wiper 20. The air nozzle 36 is an example of an air supply nozzle. The air nozzle 36 is connected to an air pump 38 via a hose 37. When the air pump 38 (a motor 75) is driven, air is supplied from the air pump 38 to the air nozzle 36 via the hose 37, and the air is jetted out from the air nozzle 36 onto the rear windshield glass 14. An attachment position and direction of the air nozzle 36 are adjusted such that, in a state in which the rear wiper 20 is disposed at a fifth predetermined position P5 shown in FIG. 2 (a position at which the wiper blade 26 of the rear wiper 20 is tangential to the imaging range 18), the air jetted out from the air nozzle 36 is blown onto the imaging range 18. The air pump 38 and the motor 75 are shown as separate in FIG. 3 but may be integrated. The air nozzle 36, hose 37, air pump 38 and motor 75 are an example of an air supplier.

Now, a control system is described. An on-board system 56 shown in FIG. 3 includes a bus 58. Plural ECUs that perform mutually different kinds of control and plural sensor units are respectively connected to the bus 58. Note that FIG. 3 depicts only portions of the on-board system 56. The plural ECUs connected to the bus 58 include the electronic inner mirror ECU 60 and the washing control ECU 72. The plural sensor units connected to the bus 58 include a rain sensor 68 and a shift position sensor 69. The rain sensor 68 senses raindrops adhering to the windshield glass. The shift position sensor 69 senses a shift position of a transmission of the vehicle 10. The rain sensor 68 is an example of a droplet detector and of the deposit detector.

The washing control ECU 72 includes a CPU 72A, memory 72B and a nonvolatile storage device 72C. The washing control ECU 72 constitutes a portion of a vehicle washing device 70. A washing program 74 is stored at the storage device 72C. The washing program 74 is read out from the storage device 72C, loaded into the memory 72B, and loaded and executed by the CPU 72A. Thus, the washing control ECU 72 executes washing processing, which is described below. The washing control ECU 72 is an example of a controller.

The washing program 74 may be stored in a non-transitory recording medium such as an HDD, SSD, DVD or the like and may be loaded into the memory 72B from the non-transitory recording medium. The washing program 74 may be recorded at a remote server or the like and may be loaded into the memory 72B via a wired or wireless network connection.

The washing control ECU 72 is connected to the wiper motor 80 via a wiper motor driving section 82. The wiper motor 80 generates the driving force that causes the rear wiper 20 to reciprocatingly wipe. The washing control ECU 72 is also connected to a rotation position sensor 83 and a rear wiper switch 84. The rotation position sensor 83 senses rotation speeds and rotation angles of an output shaft of the wiper motor 80. The wiper motor driving section 82 receives commands for rotation directions and rotation speeds of the wiper motor 80 from the washing control ECU 72, and the wiper motor driving section 82 controls rotary driving of the wiper motor 80 in accordance with the commanded rotation directions and rotation speeds.

The rear wiper switch 84 includes an operation selector switch 85, for switching operation of the rear wiper 20, and a usual operation switch 86, for commanding usual operation of the rear wiper 20. The operation selector switch 85 can be switched between contacts at an operation position (ON) for operating the rear wiper 20, an automatic operation position (AUTO) for operating the rear wiper 20 when raindrops are sensed by the rain sensor 68 and the like, and a stop position (OFF). The usual operation switch 86 can be switched between contacts at a position for commanding usual operation of the rear wiper 20 (ON) and a position for not commanding usual operation of the rear wiper 20 (OFF). The washing control ECU 72 detects the contact positions of the operation selector switch 85 and usual operation switch 86 of the rear wiper switch 84. The meaning of the term "usual operation" as used here is intended to include an operation of wiping from the park position to the reverse position without stopping or proceeding in the opposite direction, and wiping from the reverse position to the park position without stopping or proceeding in the opposite direction.

The washing control ECU 72 is connected to the motor 34 that drives the washer pump 33, via a washer pump driving section 78. The washer pump driving section 78 receives commands for operation timings and operation durations of the motor 34 from the washing control ECU 72, and the washer pump driving section 78 turns on the motor 34 for the commanded durations at the commanded operation timings.

The washing control ECU 72 is connected to the motor 75 that drives the air pump 38 via an air pump driving section 76. The air pump driving section 76 receives commands for operation timings and operation durations of the motor 75 from the washing control ECU 72, and the air pump driving section 76 turns on the motor 75 for the commanded durations at the commanded operation timings.

Now, operation of the first exemplary embodiment is described. The washing control ECU 72 executes the washing processing illustrated in FIG. 4 while an ignition switch of the vehicle 10 is on. In step 150 of the washing processing, the washing control ECU 72 makes a determination as to whether a current operation mode of the electronic inner mirror 61 is the mirror mode.

In the present exemplary embodiment, a usual mode and a special mode are provided as operation modes of the rear wiper 20. In the usual mode, the rear wiper 20 wipes (by the usual operation) the full wiping range 28 of the rear windshield glass 14 (the range between the park position Ps and the reverse position Pi). In the special mode, the imaging range 18 of the rear windshield glass 14 is preferentially wiped compared to the usual mode. The usual mode is an example of a first mode and the special mode is an example of a second mode.

When the current operation mode of the electronic inner mirror 61 is the mirror mode, the result of the determination in step 150 is affirmative, the washing control ECU 72 proceeds to step 152, and the operation mode of the rear wiper 20 is switched to the usual mode. In step 152, the washing control ECU 72 makes a determination as to whether the operation selector switch 85 of the rear wiper switch 84 is at the operation position (ON). When the result of the determination in step 152 is affirmative, the washing control ECU 72 proceeds to step 158. In step 158, the washing control ECU 72 causes the rear wiper 20 to wipe the full wiping range 28 of the rear windshield glass 14 in the usual mode.

More specifically, as shown in FIG. 5, the wiper motor 80 is driven at a constant speed such that the rear wiper 20 reciprocatingly wipes the rear windshield glass 14 between the park position Ps and the reverse position Pi at a predetermined speed, which is specified in advance. Thus, the full wiping range 28 of the rear windshield glass 14 is wiped uniformly by the rear wiper 20 and appears as an optical image in the presenter 62 of the electronic inner mirror 61 that is in the mirror mode, and a field of view rearward of the vehicle 10 through the rear windshield glass 14 is assured.

FIG. 5 shows an example in which driving of the washer pump 33 and jetting out of washing fluid from the washer nozzle 31 are started when movement of the rear wiper 20 starts in a wiping period of an outward path of the rear wiper 20, and the jetting out of washing fluid from the washer nozzle 31 is stopped at a timing in the wiping period of the outward path before the rear wiper 20 wipes the imaging range 18 (for example, a timing when the rear wiper 20 reaches a third predetermined position P3 shown in FIG. 2). However, jetting out of washing fluid in the usual mode is not limited by the example shown in FIG. 5: for example, a washing fluid jetting out period may be made shorter; for example, the washing fluid may also be jetted out in a wiping period of a return path of the rear wiper 20; and, for example, the washing fluid may be not jetted out when raindrops are sensed by the rain sensor 68.

When the result of the determination in step 152 is negative, the washing control ECU 72 proceeds to step 154. In step 154, the washing control ECU 72 makes a determination as to whether the operation selector switch 85 of the rear wiper switch 84 is at the automatic operation position (AUTO). When the result of the determination in step 154 is negative, the washing control ECU 72 returns to step 150 and wiping operations are not performed by the rear wiper 20.

When the result of the determination in step 154 is affirmative, the washing control ECU 72 proceeds to step 156. In step 156, the washing control ECU 72 makes a determination as to whether raindrops have been sensed by the rain sensor 68. When the result of the determination in step 156 is negative, the washing control ECU 72 returns to step 150 and wiping operations are not performed by the rear wiper 20.

When the operation selector switch 85 of the rear wiper switch 84 is at the automatic operation position (AUTO) and raindrops have been sensed by the rain sensor 68, the result of the determination in step 156 is affirmative, the washing control ECU 72 proceeds to step 158, and the full wiping range 28 of the rear windshield glass 14 is wiped by the rear wiper 20 in the usual mode as described above.

Alternatively, when the current operation mode of the electronic inner mirror 61 is the camera mode, the result of the determination in step 150 is negative, the washing control ECU 72 proceeds to step 160, and the operation mode of the rear wiper 20 is set to the special mode. In step 160, the washing control ECU 72 makes a determination as to whether the operation selector switch 85 of the rear wiper switch 84 is at the operation position (ON). When the result of the determination in step 160 is affirmative, the washing control ECU 72 proceeds to step 166.

When the result of the determination in step 160 is negative, the washing control ECU 72 proceeds to step 162. In step 162, the washing control ECU 72 makes a determination as to whether the operation selector switch 85 of the rear wiper switch 84 is at the automatic operation position (AUTO). When the result of the determination in step 162 is negative, the washing control ECU 72 returns to step 150, and wiping operations are not performed by the rear wiper 20.

When the result of the determination in step 162 is affirmative, the washing control ECU 72 proceeds to step 164. In step 164, the washing control ECU 72 makes a determination as to whether raindrops have been sensed by the rain sensor 68. When the result of the determination in step 164 is negative, the washing control ECU 72 returns to step 150, and wiping operations are not performed by the rear wiper 20.

In step 166, the washing control ECU 72 makes a determination as to whether the usual operation switch 86 of the rear wiper switch 84 is at the position commanding usual operation of the rear wiper 20 (ON). When the result of the determination in step 166 is affirmative, the washing control ECU 72 proceeds to step 158, the operation mode of the rear wiper 20 is switched to the usual mode, and the full wiping range 28 of the rear windshield glass 14 is wiped by the rear wiper 20 in the usual mode. Therefore, even if the electronic inner mirror 61 is in the camera mode, the rear windshield glass 14 is wiped in the usual mode when an operation has been performed via the usual operation switch 86 to command usual operation of the rear wiper 20.

When the result of the determination in step 166 is negative, the washing control ECU 72 proceeds to step 168. In step 168, the washing control ECU 72 makes a determination as to whether the shift position of the transmission of the vehicle 10 sensed by the shift position sensor 69 is a reverse position (R). When the result of the determination in step 168 is affirmative, the washing control ECU 72 proceeds to step 158, the operation mode of the rear wiper 20 is switched to the usual mode, and the full wiping range 28 of the rear windshield glass 14 is wiped by the rear wiper 20 in the usual mode. Therefore, even if the electronic inner mirror 61 is in the camera mode, the rear windshield glass 14 is wiped in the usual mode when the shift position of the transmission of the vehicle 10 is the reverse position (R).

When the result of the determination in step 168 is negative, the washing control ECU 72 proceeds to step 170. In step 170, the washing control ECU 72 causes the rear wiper 20 to wipe the rear windshield glass 14 in the special mode, which wipes the imaging range 18 of the rear windshield glass 14 preferentially compared to the usual mode. Examples of operation patterns in the special mode are illustrated below.

Figure 6:
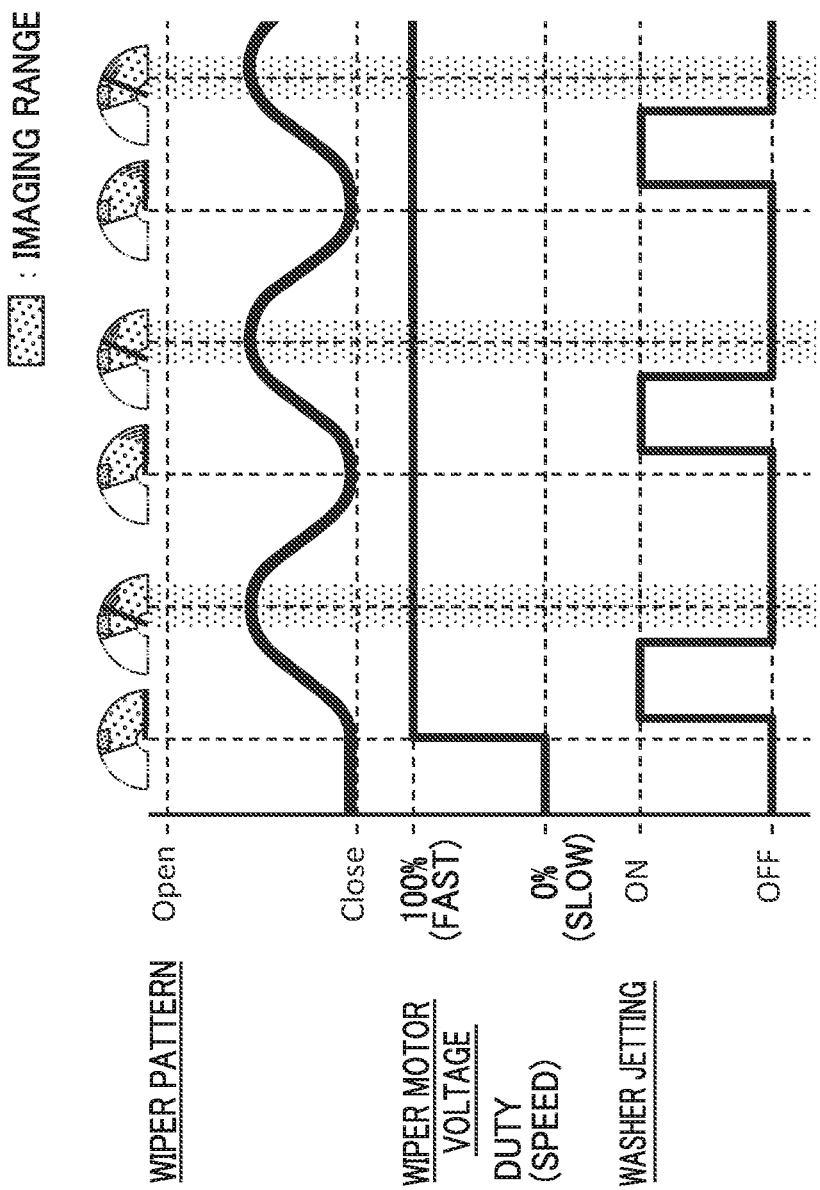
FIG. 6 is a timing chart showing an example of operation in a special mode.

One example of an operation pattern in the special mode is a partway reverse operation pattern, which is shown in FIG. 6. The partway reverse operation pattern is a pattern in which the rear wiper 20 reciprocally wipes the rear windshield glass 14 between a first predetermined position P1 (see FIG. 2) and the park position Ps. The first predetermined position P1 is specified to be between the imaging range 18 (more specifically, a portion of the imaging range 18 at the side thereof at which the reverse position Pi is located) and the reverse position Pi. In the partway reverse operation pattern, a wiping range of the rear wiper 20 is narrower than the full wiping range 28 that is the wiping range in the usual mode. Therefore, a proportion of a predetermined duration (a wiping period of the rear wiper 20) that is spent wiping the imaging range 18 is higher. Thus, the imaging range 18 is preferentially wiped.

FIG. 6 shows an example in which jetting out of washing fluid from the washer nozzle 31 is started when movement of the rear wiper 20 starts in a wiping period of the outward path of the rear wiper 20, and the jetting out of washing fluid from the washer nozzle 31 is stopped at a timing in the wiping period of the outward path when the rear wiper 20 reaches the third predetermined position P3 (see FIG. 2) before the rear wiper 20 wipes the imaging range 18. Accordingly, direct deposition of the washing fluid in the imaging range 18 may be suppressed, and disruption occurring in images captured by the rear camera 16 through the rear windshield glass 14 may be suppressed. However, jetting out of washing fluid in the partway reverse operation pattern is not limited by the example shown in FIG. 6: for example, the washing fluid jetting out period may be made shorter; for example, the washing fluid may also be jetted out in the wiping period of the return path of the rear wiper 20; and, for example, the washing fluid may be not jetted out when raindrops are sensed by the rain sensor 68. Note that the third predetermined position is specified to be between the park position Ps and the imaging range 18 (more specifically, an end portion of the imaging range 18 at the side thereof at which the park position Ps is located).

Figure 7:
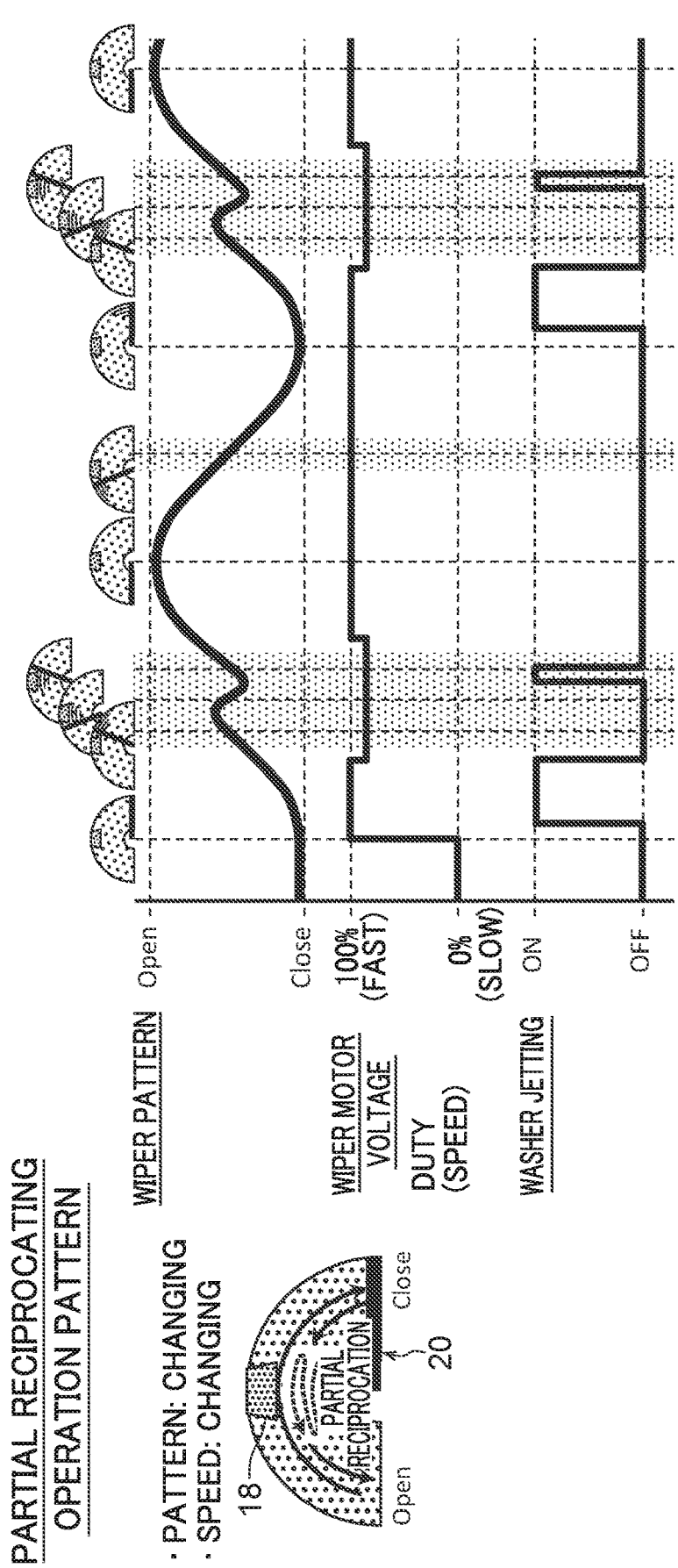
FIG. 7 is a timing chart showing another example of operation in the special mode.

An alternative example of an operation pattern in the special mode is a partial reciprocating operation pattern, which is shown in FIG. 7. The partial reciprocating operation pattern is a pattern in which, as well as wiping the full wiping range 28 of the rear windshield glass 14, the rear wiper 20 reciprocatingly wipes the rear windshield glass 14 between the first predetermined position P1 and a second predetermined position P2 (see FIG. 2) a predetermined number of times. The second predetermined position P2 is specified to be between the imaging range 18 (more specifically, the end portion of the imaging range 18 at the side thereof at which the park position Ps is located) and the park position Ps. To describe this pattern more specifically, while the rear wiper 20 is wiping from the park position to the reverse position, the rear wiper 20 reciprocatingly wipes between the above-mentioned first predetermined position and second predetermined position the predetermined number of times. In the partial reciprocating operation pattern too, the proportion of the wiping period of the rear wiper 20 that is spent wiping the imaging range 18 is higher than in the usual mode. Thus, the imaging range 18 is preferentially wiped.

In FIG. 7, the rear wiper 20 reciprocatingly wipes between the first predetermined position and the second predetermined position the predetermined number of times while the rear wiper 20 is wiping from the park position to the reverse position (outward path wiping), but this is not limiting. For example, the rear wiper 20 may reciprocatingly wipe between the first predetermined position and the second predetermined position a predetermined number of times while the rear wiper 20 is wiping from the reverse position to the park position (return path wiping). Further, the rear wiper 20 may wipe between the first predetermined position and the second predetermined position predetermined numbers of times both during outward path wiping and during return path wiping.

FIG. 7 shows an example in which jetting out of washing fluid from the washer nozzle 31 is started when movement of the rear wiper 20 starts in the wiping period of the outward path of the rear wiper 20, the jetting out of washing fluid from the washer nozzle 31 is stopped at a timing in the wiping period of the outward path when the rear wiper 20 reaches the third predetermined position P3 (see FIG. 2) before the rear wiper 20 wipes the imaging range 18 and, additionally, the washing fluid is jetted out for a short duration while the rear wiper 20 is wiping the imaging range 18. However, jetting out of washing fluid in the partial reciprocating operation pattern is not limited by the example shown in FIG. 7: for example, the washing fluid jetting out period may be made shorter; for example, the washing fluid may be not jetted out while the rear wiper 20 is wiping the imaging range 18; for example, the washing fluid may also be jetted out in the wiping period of the return path of the rear wiper 20; and, for example, the washing fluid may be not jetted out when raindrops are sensed by the rain sensor 68.

Figure 8:
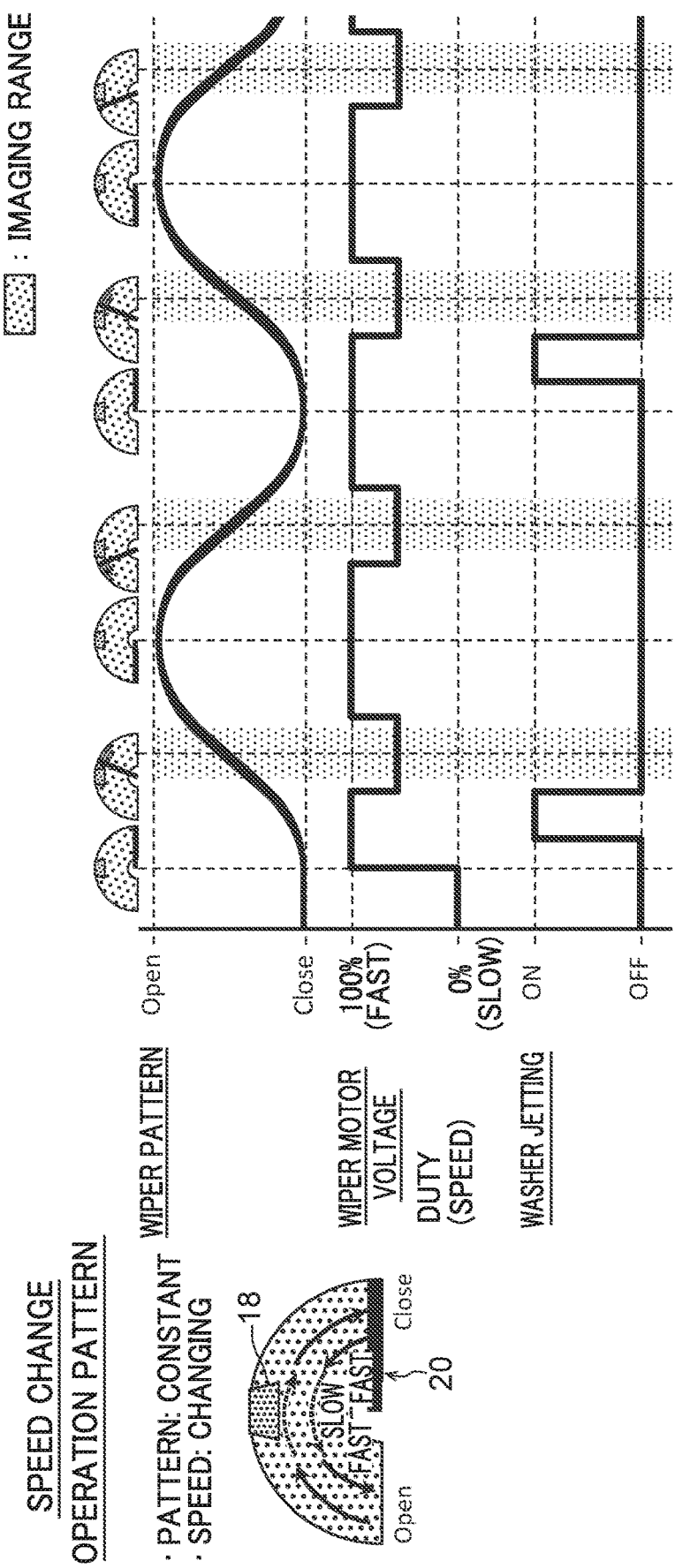
FIG. 8 is a timing chart showing another example of operation in the special mode.

Another alternative example of an operation pattern in the special mode is a speed change operation pattern, which is shown in FIG. 8. The speed change operation pattern is a pattern in which, by a duty ratio of driving of the wiper motor 80 being changed, a wiping speed while the rear wiper 20 is wiping the imaging range 18 of the rear windshield glass 14 is made lower than a wiping speed while the rear wiper 20 is wiping ranges outside the imaging range 18. In the speed change operation pattern too, the proportion of the wiping period of the rear wiper 20 that is spent wiping the imaging range 18 is higher than in the usual mode. Thus, the imaging range 18 is preferentially wiped.

FIG. 8 shows an example in which jetting out of washing fluid from the washer nozzle 31 is started at a timing in the wiping period of the outward path of the rear wiper 20 when the rear wiper 20 reaches a fourth predetermined position P4 of the rear windshield 14 (see FIG. 2) and the jetting out of washing fluid from the washer nozzle 31 is stopped at a timing in the wiping period of the outward path when the rear wiper 20 reaches the third predetermined position P3. The fourth predetermined position P4 is specified to be between the park position Ps and the imaging range 18 (more specifically, a portion of the imaging range 18 at the side thereof at which the park position Ps is located). A distance between the park position Ps and the fourth predetermined position P4 is less than a distance between the park position Ps and the third predetermined position P3. However, jetting out of washing fluid in the speed change operation pattern is not limited by the example shown in FIG. 8: for example, the washing fluid jetting out period may be made shorter; for example, the washing fluid may also be jetted out in the wiping period of the return path of the rear wiper 20; and, for example, the washing fluid may be not jetted out when raindrops are sensed by the rain sensor 68.

Figure 9:
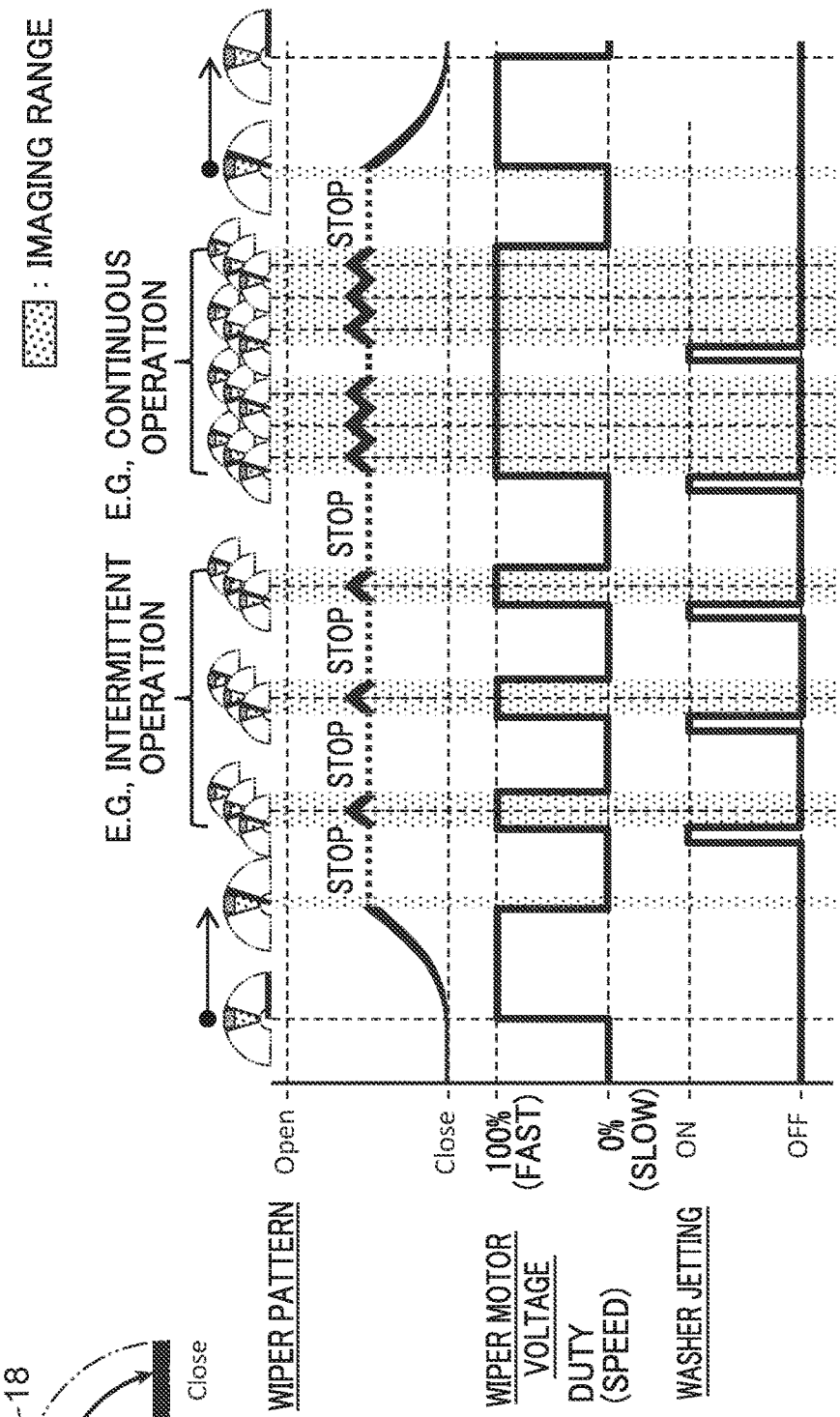
FIG. 9 is a timing chart showing another example of operation in the special mode.

Another alternative example of an operation pattern in the special mode is an imaging region operation pattern, which is shown in FIG. 9. The imaging region operation pattern is a combination of the partway reverse operation pattern shown in FIG. 6 with the partial reciprocating operation pattern shown in FIG. 7. That is, the imaging region operation pattern is a pattern in which the rear wiper 20 reciprocatingly wipes between the first predetermined position P1 and the park position Ps and reciprocatingly wipes a predetermined number of times between the first predetermined position P1 and the second predetermined position P2. In the imaging region operation pattern, the reciprocating wiping between the first predetermined position P1 and the second predetermined position P2 may be intermittent reciprocating wiping that is interspersed with stopped periods, as indicated by "intermittent operation" in FIG. 9, and may be continuous reciprocating wiping without the provision of stopped periods, as indicated by "continuous operation" in FIG. 9. In the imaging region operation pattern too, the proportion of the wiping period of the rear wiper 20 that is spent wiping the imaging range 18 is higher than in the usual mode. Thus, the imaging range 18 is preferentially wiped.

FIG. 9 shows an example in which jetting out of washing fluid from the washer nozzle 31 is started at a timing in the wiping period of the outward path of the rear wiper 20 when the rear wiper 20 reaches the second predetermined position P2 and the jetting out of washing fluid from the washer nozzle 31 is stopped at a timing in the wiping period of the outward path when the rear wiper 20 reaches the third predetermined position P3. However, jetting out of washing fluid in the imaging region operation pattern is not limited by the example shown in FIG. 9: for example, the washing fluid jetting out period may be made shorter; for example, the washing fluid may also be jetted out in the wiping period of the return path of the rear wiper 20; and, for example, the washing fluid may be not jetted out when raindrops are sensed by the rain sensor 68.

Figure 10:
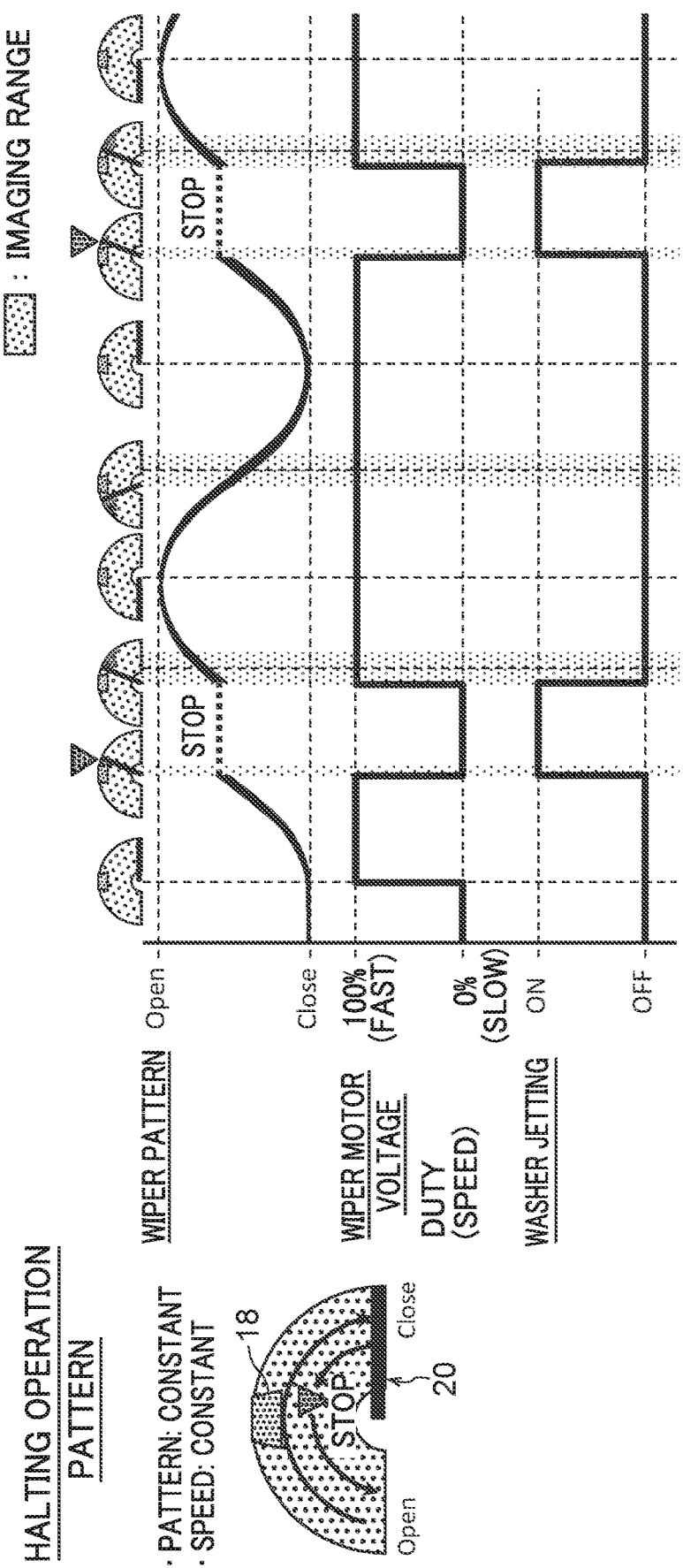
FIG. 10 is a timing chart showing another example of operation in the special mode.

Another alternative example of an operation pattern in the special mode is a halting operation pattern, which is shown in FIG. 10. The halting operation pattern is a pattern in which the rear wiper 20 reciprocatingly wipes between the first predetermined position P1 and the park position Ps, the movement of the rear wiper 20 stops for a predetermined duration at the third predetermined position P3 in the outward path movement of the rear wiper 20, as indicated by "stop" in FIG. 10, and washing fluid is jetted out from the washer nozzle 31 for that duration. In the halting operation pattern, the washing fluid jetted out from the washer nozzle 31 while the movement of the rear wiper 20 is stopped at the third predetermined position P3 infiltrates deposits adhering to the imaging range 18, and the imaging range 18 is wiped thereafter. Thus, the imaging range 18 is wiped preferentially compared to the usual mode.

Jetting out of washing fluid in the halting operation pattern is not limited by the example shown in FIG. 10: for example, the washing fluid jetting out period may be made shorter than the period in which movement of the rear wiper 20 is stopped; for example, the washing fluid may also be jetted out in the wiping period of the return path of the rear wiper 20; and, for example, the washing fluid may be not jetted out when raindrops are sensed by the rain sensor 68.

Figure 11:
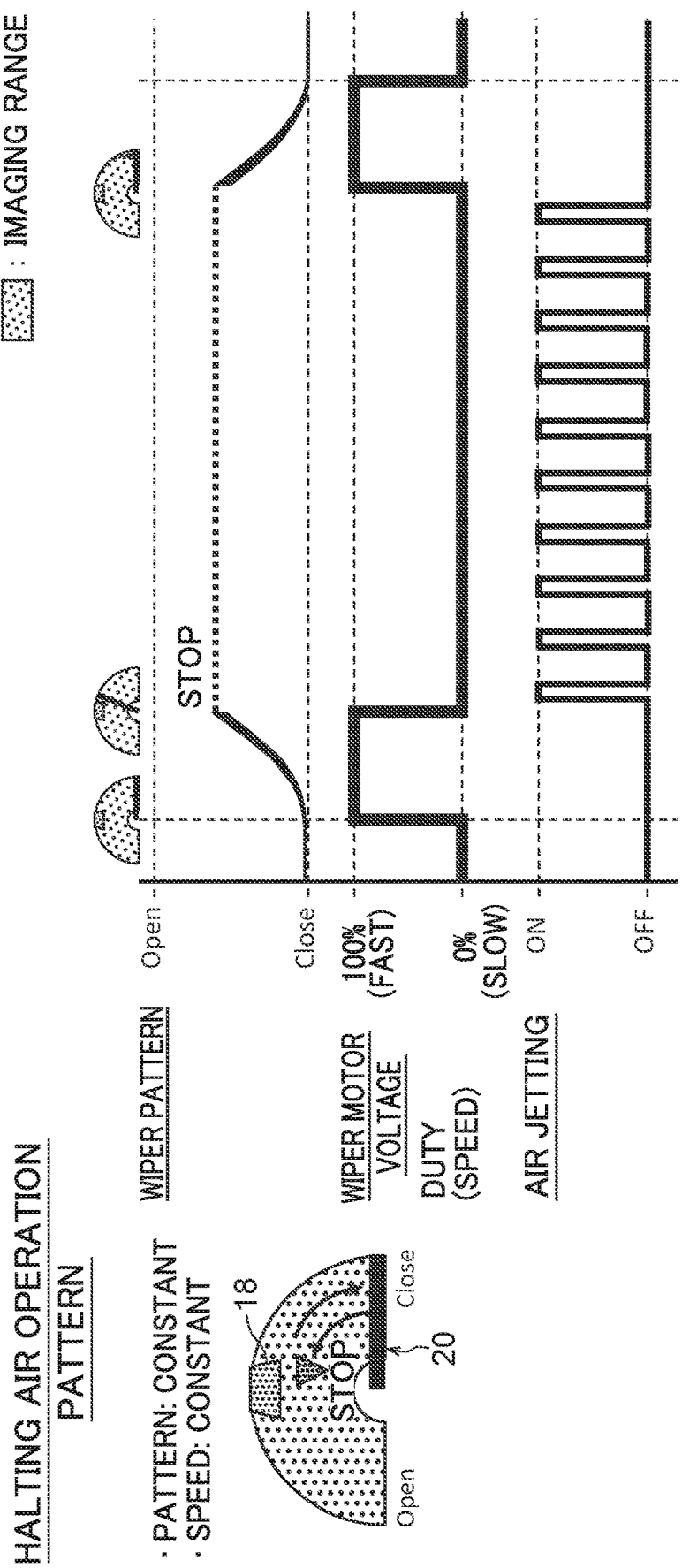
FIG. 11 is a timing chart showing another example of operation in the special mode.

Another alternative example of an operation pattern in the special mode is a halting air operation pattern, which is shown in FIG. 11. The halting air operation pattern is a pattern in which the rear wiper 20 reciprocatingly wipes between the park position Ps and the fifth predetermined position P5, the movement of the rear wiper 20 stops for a predetermined duration at the fifth predetermined position P5, as indicated by "stop" in FIG. 11, and air is intermittently jetted out from the air nozzle 36 for that duration. The halting air operation pattern is a favorable operation pattern when the rear windshield glass 14 is in a wet condition due to rain or the like. Water drops adhering in the imaging range 18 are blown away by the air being blown into the imaging range 18 while the movement of the rear wiper 20 is stopped at the fifth predetermined position P5.

In the special mode, by the rear wiper 20 wiping in any of the operation patterns illustrated above, a degree of cleanliness of the imaging range 18 of the rear windshield glass 14 (a degree to which dust, smears and the like are absent) may be restored quickly, and disruption of images captured by the rear camera 16 and displayed at the presenter 62 of the electronic inner mirror 61 in the camera mode may be suppressed.

Second Exemplary Embodiment

Now, a second exemplary embodiment is described. Structures of the second exemplary embodiment are the same as in the first exemplary embodiment, the same reference symbols are assigned to respective portions, and descriptions thereof are not given here. Portions of washing processing according to the second exemplary embodiment that differ from the first exemplary embodiment are described below with reference to FIG. 12.

In the washing processing according to the second exemplary embodiment, when the operation mode of the electronic inner mirror 61 is the camera mode (the result of the determination in step 150 is negative), the operation selector switch 85 of the rear wiper switch 84 is at the automatic operation position (AUTO) (the result of the determination in step 162 is affirmative) and raindrops are not sensed by the rain sensor 68 (the result of the determination in step 164 is negative), the washing control ECU 72 proceeds to step 174. In step 174, the washing control ECU 72 makes a determination as to whether adherence of a deposit is detected in the imaging range 18 on the rear windshield glass 14. This determination may be implemented by the washing control ECU 72 executing, for example, the following processing.

First, the washing control ECU 72 acquires from the electronic inner mirror ECU 60 an imaging device rearward of the vehicle 10 that has been captured by the rear camera 16. Then, on the basis of the image acquired from the electronic inner mirror ECU 60, the washing control ECU 72 calculates an index evaluating a degree of soiling of the imaging range 18 for the rear camera 16 on the rear windshield glass 14. The index of the degree of soiling of the imaging range 18 that is employed may be, for example, an index that evaluates an overall degree of soiling (a transmissivity) of the imaging range 18. More specifically, an average brightness or a minimum brightness of the whole image may be standardized within, for example, a numerical range from 0 to 100 and the standardized value may be employed as the index of the degree of soiling of the washing object. The washing control ECU 72 makes the determination as to whether a deposit has adhered to the imaging range 18 by comparing the calculated index of the degree of soiling of the imaging range 18 with a predetermined value.

When the index of the degree of soiling of the imaging range 18 is equal to or greater than the predetermined value (the degree of soiling is small), the result of the determination in step 174 is negative, the washing control ECU 72 returns to step 150, and wiping operations are not performed by the rear wiper 20. Alternatively, when the index of the degree of soiling of the imaging range 18 is less than the predetermined value (the degree of soiling is large), the result of the determination in step 174 is affirmative and the washing control ECU 72 proceeds to step 166. Then, if the result of a determination in step 166 or 168 is affirmative, in step 158 the rear windshield glass 14 is wiped by the rear wiper 20 in the usual mode. If the results of the determinations in step 166 and step 168 are both negative, in step 170 the rear windshield glass 14 is wiped by the rear wiper 20 in the special mode. Thus, deposits adhering to the imaging range 18 are quickly removed.

In the washing processing according to the second exemplary embodiment, when the operation mode of the electronic inner mirror 61 is the mirror mode (the result of the determination in step 150 is affirmative), the operation selector switch 85 of the rear wiper switch 84 is at the automatic operation position (AUTO) (the result of the determination in step 154 is affirmative) and raindrops are not sensed by the rain sensor 68 (the result of the determination in step 156 is negative), the washing control ECU 72 proceeds to step 172. In step 172, similarly to step 174 described above, the washing control ECU 72 makes a determination as to whether adherence of a deposit is detected in the imaging range 18 on the rear windshield glass 14.

When the index of the degree of soiling of the imaging range 18 is equal to or greater than the predetermined value (the degree of soiling is small), the result of the determination in step 172 is negative, the washing control ECU 72 returns to step 150, and wiping operations are not performed by the rear wiper 20. Alternatively, when the index of the degree of soiling of the imaging range 18 is less than the predetermined value (the degree of soiling is large), the result of the determination in step 172 is affirmative and the washing control ECU 72 proceeds to step 166. Then, if the results of the determinations in step 166 and step 168 are both negative, in step 170 the rear windshield glass 14 is wiped by the rear wiper 20 in the special mode. Thus, deposits adhering to the imaging range 18 are quickly removed.

In the exemplary embodiments described above, the usual mode and the special mode are provided as operation modes of the rear wiper 20. When the operation mode of the rear wiper 20 is switched to the special mode, the imaging range 18 of the rear windshield glass 14 is preferentially wiped by the rear wiper 20, and even if a degree of cleanliness of the imaging range 18 falls, the degree of cleanliness may be quickly restored.

If a windshield is, for example, a front windshield glass of the vehicle 10, the front windshield glass is continuously within the field of view of an occupant of the vehicle 10. Therefore, if a front wiper wiping the front windshield glass is caused to operate in a special mode and the wiping speed, wiping range and the like are changed, this causes disturbance to the occupant of the vehicle 10, particularly to a driver. In contrast, when the rear wiper 20 is operated in the special mode, disturbance caused to an occupant of the vehicle 10 is slight even when, for example, the rear wiper 20 stops between the park position Ps and the reverse position Pi. Further, each operation pattern of the special mode is a pattern in which the wiping speed and wiping range are not changed while the rear wiper 20 is wiping the imaging range 18. Therefore, disturbance caused to an occupant of the vehicle 10 may be made even slighter.

In the exemplary embodiments described above, the usual mode is provided as an operation mode of the rear wiper 20. When the operation mode of the rear wiper 20 has been switched to the usual mode, disturbance caused to an occupant of the vehicle 10 by operation of the rear wiper 20 may be assuredly prevented.

In the exemplary embodiments described above, the operation mode of the rear wiper 20 is switched in conjunction with switching of the operation mode of the electronic inner mirror 61. Therefore, an occupant of the vehicle 10 may be saved the inconvenience of instructing switching of the operation mode of the rear wiper 20.

In the above descriptions, a mode is described in which the operation mode of the rear wiper 20 is switched to the usual mode or the special mode in accordance with the operation mode of the electronic inner mirror 61, but this is not limiting. For example, a selector switch may be provided that switches the operation mode of the rear wiper 20 between the usual mode and the special mode, and the operation mode of the rear wiper 20 may be switched to the usual mode or the special mode in accordance with switching of the selector switch regardless of the operation mode of the electronic inner mirror 61. In this mode, by operating the selector switch, an occupant of the vehicle 10 may switch the operation mode of the rear wiper 20 at desired timings.

In the above descriptions, a mode is described in which the washer nozzle 31 is attached to the rear wiper 20, but this is not limiting. The washer nozzle 31 may be attached to the back door 12 of the vehicle 10.

In the above descriptions, a mode is described in which the air nozzle 36 is attached to the rear wiper 20, but this is not limiting. The air nozzle 36, hose 37, air pump 38 and motor 75 may be omitted.

In the above descriptions, a mode is described in which the rear wiper 20 is provided at the vehicle vertical direction lower end portion vicinity of the rear windshield glass 14, but this is not limiting. For example, the rear wiper 20 may be provided at the vehicle vertical direction upper end portion vicinity of the rear windshield glass 14, in which case the pivot axle 24 may be provided at a vehicle width direction central portion vicinity of the vehicle vertical direction upper end portion vicinity of the rear windshield glass 14. Further, the pivot axle 24 may be disposed at a vehicle width direction end portion vicinity rather than at the vehicle width direction central portion vicinity.

In step 166 in the first exemplary embodiment and the second exemplary embodiment, the washing control ECU 72 makes a determination as to whether the usual operation switch 86 is at the position commanding usual operation of the rear wiper 20 (ON). However, this step may be omitted, in which case the usual operation switch 86 may be omitted.

In step 168 in the first exemplary embodiment and the second exemplary embodiment, the washing control ECU 72 makes a determination as to whether the shift position of the transmission of the vehicle 10 sensed by the shift position sensor 69 is at the reverse position (R). However, this step may be omitted.

In the first exemplary embodiment, in steps 154 and 162 and steps 156 and 164, the washing control ECU 72 makes determinations as to whether the operation selector switch 85 of the rear wiper switch 84 is at the automatic operation position (AUTO) and whether raindrops have been sensed by the rain sensor 68. However, these steps may be omitted.

Figure 4:
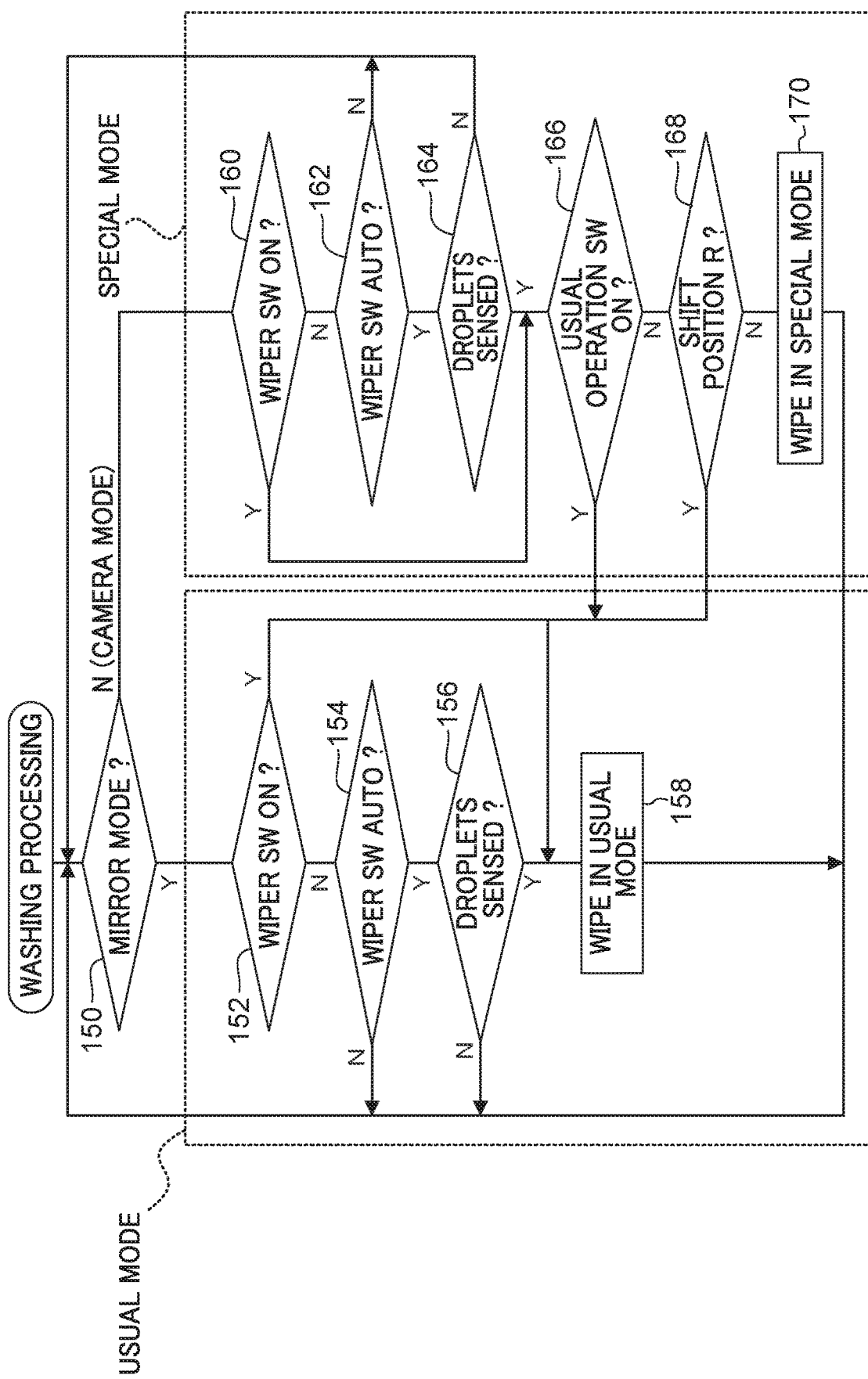
FIG. 4 is a flowchart showing an example of washing processing according to a first exemplary embodiment.
Figure 12:
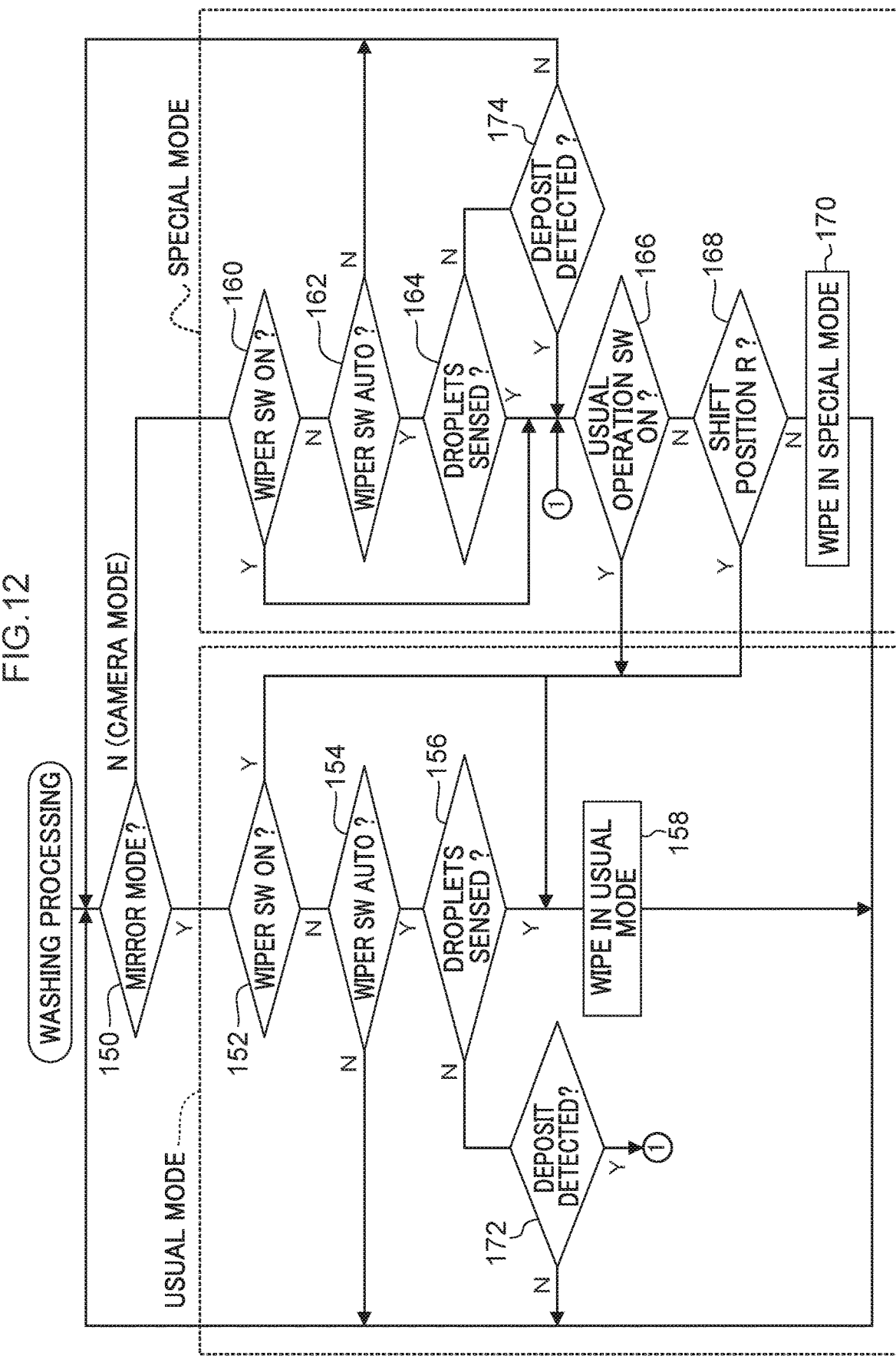
FIG. 12 is a flowchart showing an example of washing processing according to a second exemplary embodiment.

The flowcharts in FIG. 4 and FIG. 12 are examples; for example, the sequences of processing may be modified as appropriate.

The present application claims the benefit of priority of Japanese Patent Application No. 2018-179053, filed in Japan on Sep. 25, 2018, and the disclosures thereof are incorporated into the present specification by reference in their entirety.

The invention claimed is:

1. A vehicle washing device comprising:
   a wiping device configured to reciprocatingly wipe a predetermined range of a rear windshield of a vehicle, the predetermined range including a first portion that includes at least an imaging range of an imaging device that is configured to image rearward of the vehicle through the rear windshield from inside a cabin of the vehicle and a second portion that does not include the imaging range; and
   a processor that is configured to switch operation of the wiping device to one of a first mode and a second mode in accordance with an input, the first mode wiping the first portion and the second portion of the predetermined range of the rear windshield in a same way, and the second mode wiping the first portion of the predetermined range including the imaging range of the rear windshield in a way that is different from a way in which the second portion of the predetermined range is wiped.

2. The vehicle washing device according to claim 1, wherein:
   the input is a mode switching signal of an electronic mirror that is switchable between a mirror mode and an image display mode, the mirror mode reflecting light that is incident on a presenter, and the display mode displaying an image imaged by the imaging device at the presenter; and
   the processor is configured to set the operation of the wiping device to the first mode in a case in which the electronic mirror is in the mirror mode, and set the operation of the wiping device to the second mode in a case in which the electronic mirror is in the image display mode.

3. The vehicle washing device according to claim 1, wherein:
   the input is a switching signal of a selector switch that commands switching between the first mode and the second mode; and
   the processor is configured to set the operation of the wiping device to the first mode in a case in which the selector switch is in a state corresponding to the first mode, and set the operation of the wiping device to the second mode in a case in which the selector switch is in a state corresponding to the second mode.

4. The vehicle washing device according to claim 1, wherein a deposit detector detects deposits on the imaging range of the rear windshield, and in a case in which a deposit is detected by the deposit detector, the processor is configured to set the operation of the wiping device to the second mode and cause the wiping device to perform a wiping operation.

5. The vehicle washing device according to claim 1 wherein, in a case in which the operation of the wiping device is set to the second mode, the processor is configured to cause the wiping device to wipe between a first predetermined position and a park position of the wiping device, the first predetermined position being between the imaging range of the rear windshield and a reverse position of the wiping device.

6. The vehicle washing device according to claim 1 wherein, in a case in which the operation of the wiping device is set to the second mode, the processor is configured to cause the wiping device to reciprocatingly wipe a predetermined number of times between a first predetermined position and a second predetermined position, the first predetermined position being between the imaging range of the rear windshield and a reverse position of the wiping device, and the second predetermined position being between the imaging range of the rear windshield and a park position of the wiping device.

7. The vehicle washing device according to claim 1, wherein in a case in which the operation of the wiping device is set to the second mode, the processor is configured to cause a wiping speed in a case in which the first portion of the predetermined range is being wiped by the wiping device to differ from a wiping speed in a case in which the second portion of the predetermined range is being wiped by the wiping device.

8. The vehicle washing device according to claim 7, wherein the processor is configured to set the wiping speed in a case in which the first portion of the predetermined range is being wiped by the wiping device to be lower than the wiping speed in a case in which the second portion of the predetermined range is being wiped by the wiping device.

9. The vehicle washing device according to claim 1, further comprising a washing fluid supplier including a washing fluid supply nozzle that supplies washing fluid onto the rear windshield,
wherein, in a case in which the wiping device is operating from a park position of the wiping device toward a reverse position of the wiping device, the processor is configured to cause the washing fluid supplier to stop supply of the washing fluid in a case in which a wiping position by the wiping device reaches a third predetermined position, the third predetermined position being separated from the imaging range of the rear windshield by a predetermined distance to a side of the imaging range at which the park position is located.

10. The vehicle washing device according to claim 9, wherein, in a case in which the wiping device is operating from the park position toward the reverse position of the wiping device, the processor is configured to cause the washing fluid supplier to supply the washing fluid in a case in which the wiping position by the wiping device reaches a fourth predetermined position, the fourth predetermined position being located at a side of the third predetermined position at which the park position is located.

11. The vehicle washing device according to claim 9, wherein the washing fluid supply nozzle is provided at a wiper of the wiping device.

12. The vehicle washing device according to claim 1, further comprising:
a droplet detector that detects droplets on the rear windshield; and
an air supplier including an air supply nozzle that supplies air onto the rear windshield,
wherein, in a case in which a droplet is detected by the droplet detector and the operation of the wiping device is set to the second mode, the processor is configured to cause the wiping device to stop at a fifth predetermined position and cause the air supplier to supply air onto the imaging range, the fifth predetermined position being one of
between the imaging range of the rear windshield and a reverse position of the wiping device, and
between the imaging range of the rear windshield and a park position of the wiping device.

13. The vehicle washing device according to claim 12, wherein the air supply nozzle of the air supplier is provided at a wiper of the wiping device.

* * * * *